United States Patent [19]
Thompson

[11] Patent Number: 5,887,709
[45] Date of Patent: Mar. 30, 1999

[54] BEVERAGE MUG HOLDER

[76] Inventor: David M. Thompson, 802 Mantoloking Rd., Bricktown, N.J. 08723

[21] Appl. No.: 63,261

[22] Filed: Apr. 20, 1998

[51] Int. Cl.[6] .................................................. B65D 71/00
[52] U.S. Cl. ........................................... 206/217; 220/737
[58] Field of Search .................................... 206/217, 541, 206/543, 544, 546, 547, 549; 220/737, 739, 903

[56] References Cited

U.S. PATENT DOCUMENTS

| | | | |
|---|---|---|---|
| 5,071,002 | 12/1991 | Bradley | 206/217 |
| 5,207,076 | 5/1993 | Sciarrillo | 220/737 |
| 5,441,164 | 8/1995 | Beck et al. | 220/737 |
| 5,590,808 | 1/1997 | Schaeppi | 220/737 |

*Primary Examiner*—Jacob K. Ackun
*Attorney, Agent, or Firm*—Andrew W. Ludy

[57] ABSTRACT

A beverage mug and beverage can holder has slots to accommodate the handles of two mugs, which are nested together with the handles adjacent so as to conserve space. Mugs are supported by the top edges of gussets spaced around the inside bottom. Cans, smaller in diameter than mugs, are retained between the gussets. Cans with foam liners are supported by the gussets. For marine use, the holder will drain liquids to a collection point.

20 Claims, 4 Drawing Sheets

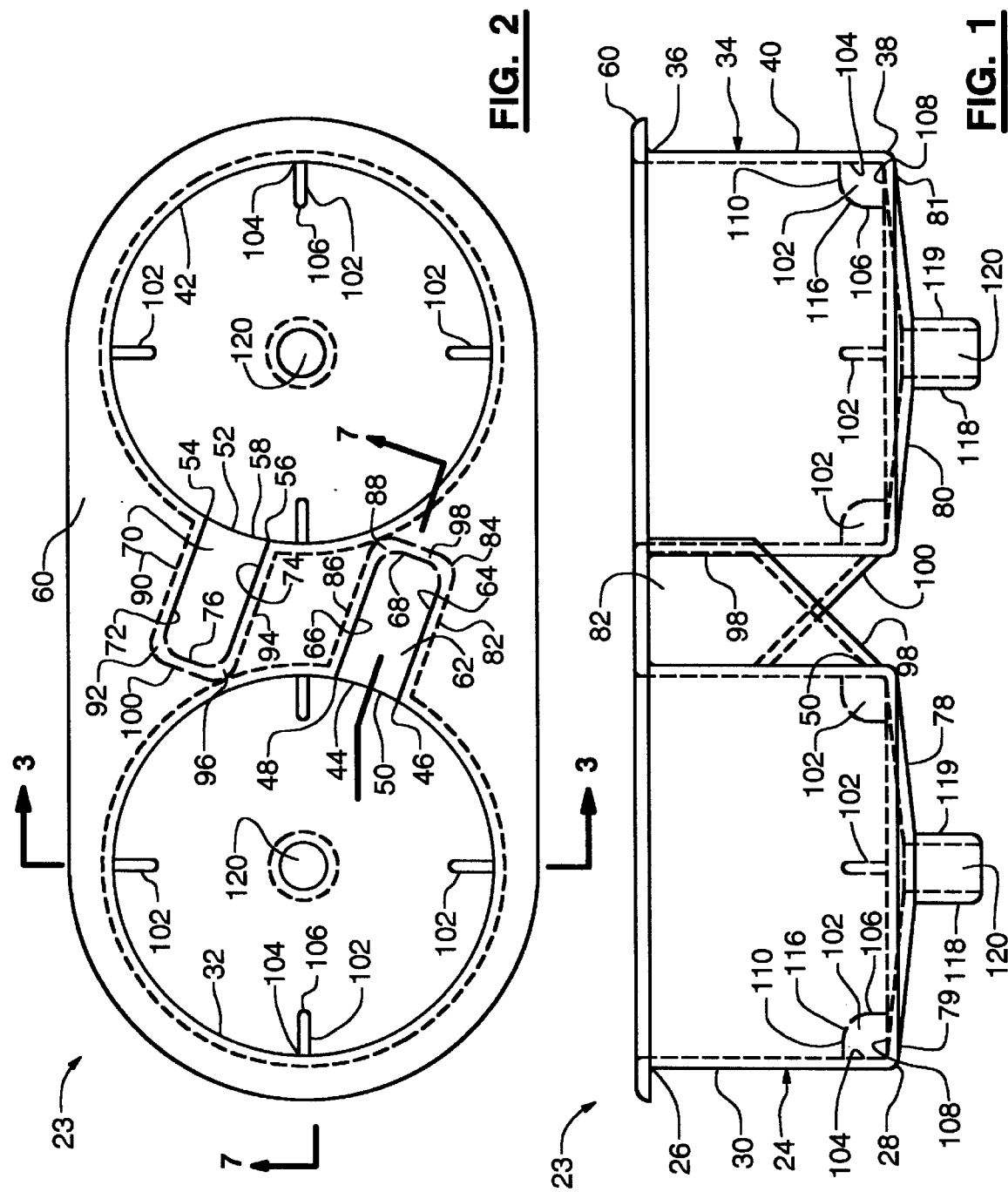

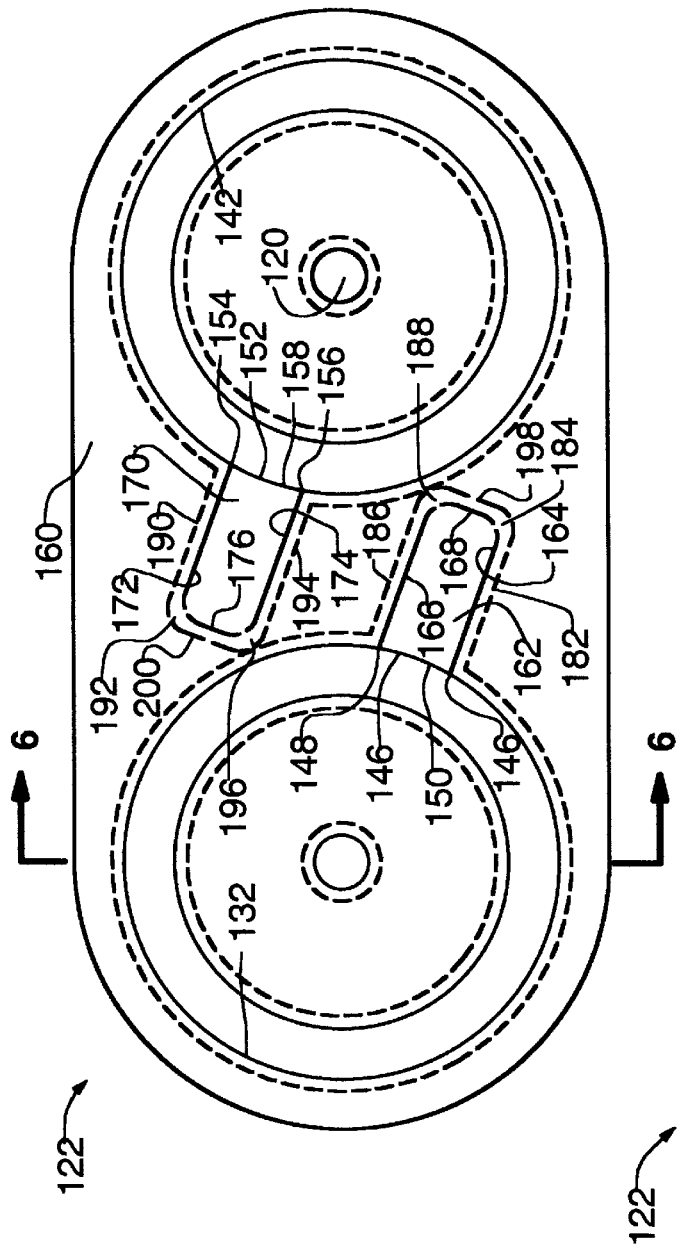

BEVERAGE MUG HOLDER

FIELD OF THE INVENTION

This invention relates generally to the field of beverage containers, and pertains, more specifically, to a holder, with a built-in drain, for beverage mugs and beverage cans with or without foam liners, holding one or two mugs at a time, and nesting the handles.

BACKGROUND OF THE INVENTION

It is common practice to drink a beverage while driving or riding in an automobile, boat, airplane, or other vehicle. It is also common to rest the beverage container in a holder between drinks, to free the hands. Holders for this purpose are known, but have displayed shortcomings. Beverage containers come in a great variety of shapes and sizes, and the holder should be capable of holding the most common of these configurations. A beverage mug has a handle for one or more fingers, and holders have no provision for the handle. A beverage can has a smaller diameter than a mug, and no current holder will accommodate both. Cans are also sometimes provided with a foam coating or slip-on shell or liner for insulation, which increases the diameter. For marine use, the holder should have a drain so that it does not fill with water. Drinks are often enjoyed in company, yet holders will typically accommodate only one beverage container. A dual mug holder should be configured to minimize the required installation space.

Accordingly, there is a need to provide a holder that will accommodate a beverage mug with a handle.

There is a further need to provide a holder that will accommodate two beverage mugs with handles, and nest them together in such a way as to conserve space.

There is a yet further need to provide a holder that will accommodate both mugs and cans, with or without foam liners.

There is a still further need to provide a holder for marine use that will drain rainwater, spray, or spilled beverage from the holder to a collection point.

SUMMARY OF THE INVENTION

The present invention is a holder that will accommodate two beverage mugs with handles, or two beverage cans with or without foam liners. The mugs are nested together with the handles adjacent so as to conserve space. For marine use, the holder will drain liquids to a collection point.

The above features, as well as further features and advantages, are attained by the present invention which may be described briefly as a holder for a beverage mug having a handle, a bottom, and an outer surface with a predetermined diameter, and for a beverage can having a bottom and an outer surface with a predetermined diameter less than the mug outer surface diameter, the holder comprising: a cylindrical shell extending between opposite upper and lower ends, the shell including an outer surface and an inner surface with a diameter greater than the mug outer surface diameter, the shell inner surface slidingly engaging the beverage mug outer surface, the shell including a slot having generally vertical first and second edges extending from the shell upper end to a terminus adjacent the shell lower end to receive the beverage mug handle; a flange projecting outward from the shell outer surface, the flange including a radial slot juxtaposed with the shell slot, the radial slot having first and second edges aligned with the shell slot first and second edges respectively, and extending from the shell outer surface outward to a terminus; a bottom plate projecting inward from the shell lower end, the bottom plate supportingly engaging the bottom of the beverage can; and engaging means for slidingly engaging the can outer surface and supportingly engaging the mug bottom.

BRIEF DESCRIPTION OF THE DRAWING

The invention will be more fully understood, while still further features and advantages will become apparent, in the following detailed description of preferred embodiments thereof illustrated in the accompanying drawing, in which:

FIG. 1 is a front elevational view of a beverage mug holder constructed in accordance with the invention;

FIG. 2 is a top plan view of the beverage mug holder of FIG. 1;

FIG. 4 is a front elevational view of another beverage mug holder constructed in accordance with the invention;

FIG. 5 is a top plan view of the beverage mug holder of FIG. 4;

DESCRIPTION OF THE PREFERRED EMBODIMENTS

Figure 7:
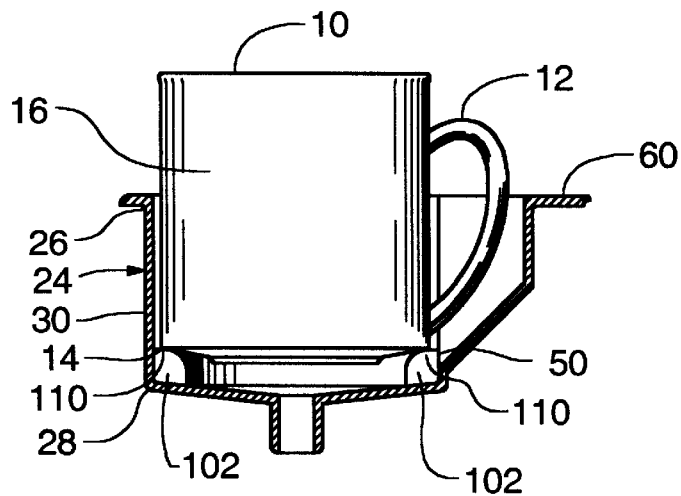
FIG. 7 is a front elevational partial cross-sectional view of the beverage mug holder of FIG. 1, taken along lines 7—7 of FIG. 2, and showing a mug inserted into the holder.
Figures 8, 9:
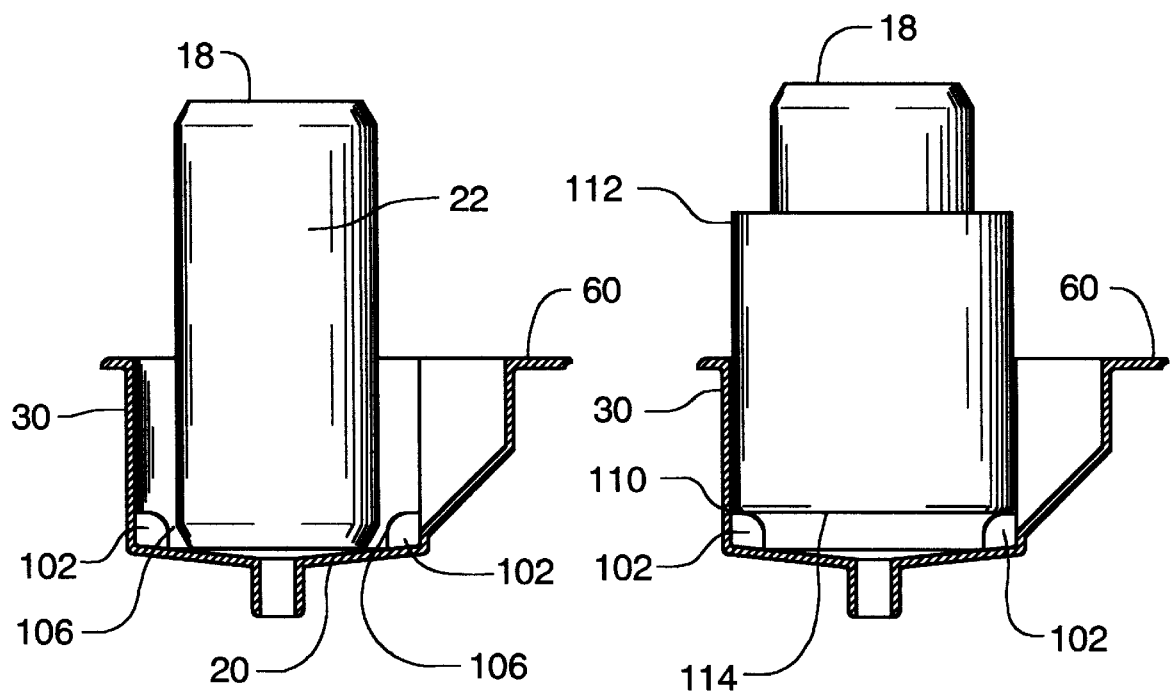
FIG. 8 is a front elevational partial cross-sectional view of the beverage mug holder of FIG. 1, taken along lines 7—7 of FIG. 2, and showing a can inserted into the holder.
FIG. 9 is a front elevational partial cross-sectional view of the beverage mug holder of FIG. 1, taken along lines 7—7 of FIG. 2, and showing a can having a foam liner inserted into the holder.

Referring now to the drawing, and especially to FIGS. 7,8 and 9 thereof, a typical beverage mug is shown at 10, having a handle 12, a bottom 14, and an outer surface 16 with a predetermined diameter. A typical beverage can is shown at 18, and has a bottom 20 and an outer surface 22 with a predetermined diameter less than the mug outer surface diameter.

Figure 3:
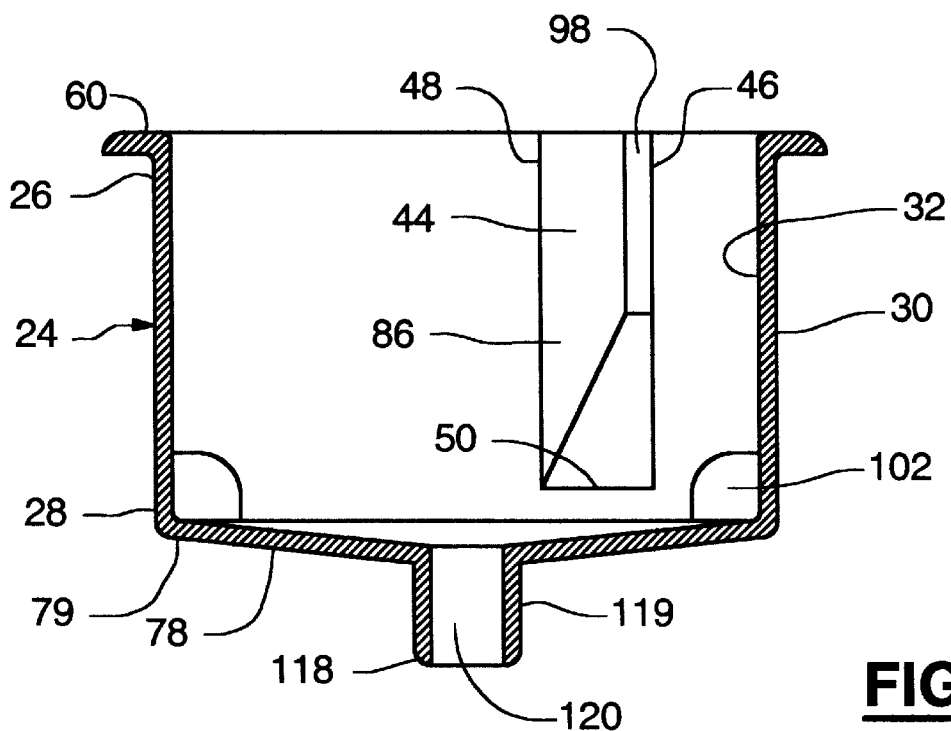
FIG. 3 is a left side elevational cross-sectional view of the beverage mug holder of FIG. 1, taken along lines 3—3 of FIG. 2.

Turning now to FIGS. 1,2 and 3, a holder for a pair of beverage mugs is shown at 23. The holder 23 also accommodates pair of beverage cans. The holder 23 comprises a right circular cylindrical first shell 24 extending along a longitudinal axis between opposite upper 26 and lower ends 28. The holder also comprises a right circular cylindrical second shell 34 extending along a longitudinal axis between opposite upper 36 and lower 38 ends. The first longitudinal axis is generally parallel to the second longitudinal axis. The first 24 and second 34 shells include an outer surface 30 and 40, and an inner surface 32 and 42 respectively. The inner surfaces 32 and 42 each have a circumference, and each have a diameter greater than the mug outer surface diameter. Each shell inner surface 32 and 42 slidingly engages the outer surface 16 of one of the beverage mugs.

The first shell 24 includes a slot 44 having generally vertical first 46 and second 48 edges, extending from the shell upper end 26 to a terminus 50 adjacent the shell lower end 28, to receive the handle of one of the beverage mugs 10.

The second shell 34 also includes a slot 52 having generally vertical first 54 and second 56 edges, extending from the shell upper end 36 to a terminus 58 adjacent the shell lower end 38, to receive the handle of one of the beverage mugs 10.

A flange 60 encircles both the first 24 and second 34 shells. The flange 60 projects outward from the first 24 and second 34 shell outer surface 30 and 40 at the shell upper end 26 and 36, respectively.

The flange 60 includes a first radial slot 62 juxtaposed with the first shell slot 44. The first radial slot 62 has first 64 and second 66 edges aligned with the first shell slot first 46 and second 48 edges respectively, and extending from the first shell outer surface 30 outward to a terminus 68.

The flange 60 also includes a second radial slot 70 juxtaposed with the second shell slot 52, the second radial slot 70 having first 72 and second 74 edges aligned with the second shell slot first 54 and second 56 edges respectively, and extending from the second shell outer surface 40 outward to a terminus 76.

The first shell 24 has a slot first side plate 82 extending from the shell slot first edge 46 outward to an outer edge 84, and extending from the shell slot terminus 50 upward to the radial slot first edge 64. The first shell 24 has a slot second side plate 86 extending from the shell slot second edge 48 outward to an outer edge 88, and extending from the shell slot terminus 50 upward to the radial slot second edge 66. The first shell 24 also has a slot end plate 98, extending between the first 84 and second 88 slot side plate outer edges, and extending from the shell slot terminus 50 upward to the radial slot terminus 68.

The second shell 34 has a slot first side plate 90 extending from the shell slot first edge 54 outward to an outer edge 92, and extending from the shell slot terminus 58 upward to the radial slot first edge 72. The second shell 34 has a slot second side plate 94 extending from the shell slot second edge 56 outward to an outer edge 96, and extending from the shell slot terminus 58 upward to the radial slot second edge 74. The second shell 34 also has a slot end plate 100, extending between the first 92 and second 96 slot side plate outer edges, and extending from the shell slot terminus 58 upward to the radial slot terminus 76.

A first bottom plate 78 projects inward from a circular outer edge 79 disposed adjacent the first shell lower end 28. A second bottom plate 80 projects inward from a circular outer edge 81 disposed adjacent the second shell lower end 38. Each bottom plate supportingly engages the bottom 20 of one of the beverage cans 18.

An important feature of the invention is the way the mug handles 12 are situated to minimize space. The first radial slot terminus 68 is disposed adjacent the second shell 34, and the second radial slot terminus 76 is disposed adjacent the first shell 24, so that when two mugs 10, are inserted into the holder 23, the handles 12 will be nested closely together to conserve space.

The holder 23 has engaging means for slidingly engaging each can outer surface 22 and supportingly engaging each mug bottom 14. In the preferred embodiment, the engaging means is a plurality of gussets 102, typically three or four, spaced apart around each shell inner surface circumference. Each gusset 102 includes a generally vertical first edge 104 attached to the first 32 and second 42 shell inner surface adjacent the shell lower end 28 and 38 respectively. A generally vertical second edge 106 is opposite the first edge 104 and inward of the first 32 and second 42 shell inner surface. A bottom edge 108 extends between the first 104 and second 106 edges, the bottom edge 108 being attached to the first 78 and second 80 bottom plate. A generally horizontal top edge 110 extends between the first 104 and second 106 edges, the top edge 110 being opposite the bottom edge 108. The gussets 102 each have a radius 116 between the second edge 106 and the top edge 110, to facilitate sliding engagement of the can outside surface 22 with the gusset second edge 106.

Thus, the top edges 110 of the gussets 102 supportingly engage the mug bottom 14 when the mug 10 is inserted into the holder 23, as shown in FIG. 7. The second edges 106 of the gussets 102 slidingly engage the can outer surface 22 when the can 18 is inserted into the holder 23, as shown in FIG. B. The top edges 110 of the gussets 102 also will supportingly engage the bottom 114 of a foam liner 112 enclosing a beverage can 18 as shown in FIG. 9.

The first 78 and second 80 bottom plate are each provided with a drain 118, including a nozzle 119 having a hole 120 therethrough in communication with the first 24 and second 34 shell respectively, for draining liquids from the holder 23. A tube (not shown) can be connected between the nozzle 119 and a collection point, such as the bilge, a holding tank, or overboard.

Figure 6:
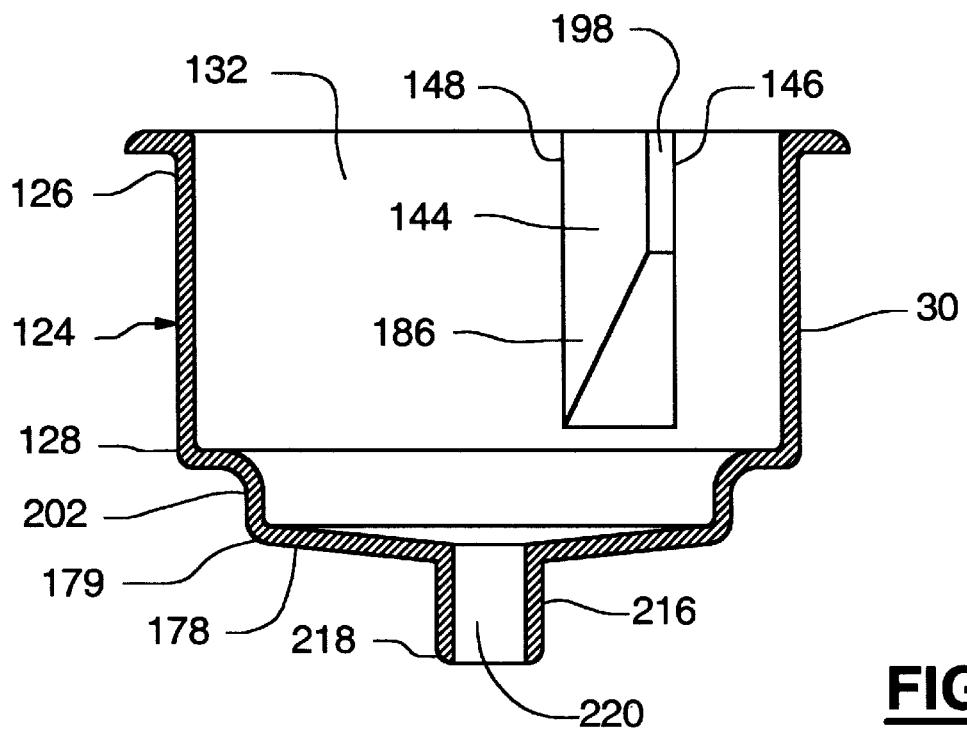
FIG. 6 is a left side elevational cross-sectional view of the beverage mug holder of FIG. 4, taken along lines 6—6 of FIG. 5.

Turning now to FIGS. 4, 5 and 6, another embodiment of the beverage mug holder is shown at 120. Holder 120 is very similar to the above-described holder 23 in that it comprises a right circular cylindrical first shell 122 extending along a longitudinal axis between opposite upper 126 and lower ends 128. The holder also comprises a right circular cylindrical second shell 134 extending along a longitudinal axis between opposite upper 136 and lower 138 ends. The first longitudinal axis is generally parallel to the second longitudinal axis. The first 124 and second 134 shells include an outer surface 130 and 140, and an inner surface 132 and 142 respectively. The inner surfaces 132 and 142 each have a circumference, and each have a diameter greater than the mug outer surface diameter. Each shell inner surface 132 and 142 slidingly engages the outer surface 16 of one of the beverage mugs.

The first shell 124 includes a slot 144 having generally vertical first 146 and second 148 edges, extending from the shell upper end 126 to a terminus 150 adjacent the shell lower end 128, to receive the handle of one of the beverage mugs 10.

The second shell 134 also includes a slot 152 having generally vertical first 154 and second 156 edges, extending from the shell upper end 136 to a terminus 158 adjacent the shell lower end 138, to receive the handle of one of the beverage mugs 10.

A flange 160 encircles both the first 124 and second 134 shells. The flange 160 projects outward from the first 124 and second 134 shell outer surface 130 and 140 at the shell upper end 126 and 136, respectively.

The flange 160 includes a first radial slot 162 juxtaposed with the first shell slot 144. The first radial slot 162 has first 164 and second 166 edges aligned with the first shell slot first 146 and second 148 edges respectively, and extending from the first shell outer surface 130 outward to a terminus 168.

The flange 160 also includes a second radial slot 170 juxtaposed with the second shell slot 152, the second radial slot 170 having first 172 and second 174 edges aligned with the second shell slot first 154 and second 156 edges respectively, and extending from the second shell outer surface 140 outward to a terminus 176.

The first shell 124 has a slot first side plate 182 extending from the shell slot first edge 146 outward to an outer edge 184, and extending from the shell slot terminus 150 upward to the radial slot first edge 164. The first shell 124 has a slot second side plate 186 extending from the shell slot second edge 148 outward to an outer edge 188, and extending from the shell slot terminus 150 upward to the radial slot second edge 166. The first shell 124 also has a slot end plate 198, extending between the first 184 and second 188 slot side plate outer edges, and extending from the shell slot terminus 150 upward to the radial slot terminus 168.

The second shell 134 has a slot first side plate 190 extending from the shell slot first edge 154 outward to an outer edge 192, and extending from the shell slot terminus 158 upward to the radial slot first edge 172. The second shell 134 has a slot second side plate 194 extending from the shell slot second edge 156 outward to an outer edge 196, and extending from the shell slot terminus 158 upward to the radial slot second edge 174. The second shell 134 also has a slot end plate 200, extending between the first 192 and second 196 slot side plate outer edges, and extending from the shell slot terminus 158 upward to the radial slot terminus 176.

A first bottom plate 178 projects inward from a circular outer edge 179 disposed adjacent first shell lower end 128. A second bottom plate 180 projects inward from a circular outer edge 181 disposed adjacent the second shell lower end 138. Each bottom plate supportingly engages the bottom 20 of one of the beverage cans 18.

An important feature of the invention is the way the mug handles 12 are situated to minimize space. The first radial slot terminus 168 is disposed adjacent the second shell 134, and the second radial slot terminus 176 is disposed adjacent the first shell 124, so that when two mugs 10, are inserted into the holder 122, the handles 12 will be nested closely together to conserve space.

The holder 122 has engaging means for slidingly engaging each can outer surface 22 and supportingly engaging each mug bottom 14. Specifically, the engaging means is a first step 202 encircling the first shell inner surface 132 circumference, and a second step 204 encircling the second shell inner surface 142 circumference. Each step includes a generally horizontal shelf 206 having a first edge 208 attached to the first 132 and second 142 shell inner surface adjacent the first 128 and second 138 shell lower end respectively. The shelf 206 extends inward to a second edge 210. A generally vertical annular wall 212 extends from the first 179 and second 181 bottom plate outer edge upward to the shelf second edge 210. The first 202 and second 204 step each have a radius 114 between the shelf second edge 210 and the annular wall 212, to facilitate sliding engagement of the can outside surface 22 with the annular wall 212.

Thus, each shelf 202 and 204 supportingly engages the bottom of one of the mugs 10 when the mug 10 is inserted into the holder 122. Each annular wall 212 slidingly engages the outer surface 22 of one of the cans 18 when the can 18 is inserted into the holder 122. Each shelf 202 and 204 also will supportingly engage the bottom 114 of a foam liner 112 enclosing a beverage can 18.

The first 178 and second 180 bottom plate are each provided with a drain 218, including a nozzle 216 having a hole 220 therethrough in communication with the first 124 and second 134 shell respectively, for draining liquids from the holder 122. A tube (not shown) can be connected between the nozzle 216 and a collection point, such as the bilge, a holding tank, or overboard.

As seen from the foregoing description, the present invention satisfies the need to provide a holder that will accommodate two beverage mugs with handles, and nest them together in such a way as to conserve space. It also satisfies the need to provide a holder that will accommodate both mugs and cans, with or without foam liners. It still further satisfies the need to provide a holder for marine use that will drain rainwater, spray, or spilled beverage from the holder to a collection point.

Although the invention has been described and illustrated in the preferred embodiments, those skilled in the art will make changes that will be seen to be functional equivalents to the present invention. For example, the engagement means is shown as gussets and as steps. It will be appreciated that a plurality of rodlike or platelike members projecting upward from the bottom plate, not connected to the inner surface, can be substituted for the gussets. Further, it will be appreciated that an annular vertical wall disposed around the bottom plate, without the shelf, can be substituted for the gussets or for the step, and still fall within the scope of the claims.

It is therefore to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. A holder for a beverage mug having a handle, a bottom, and an outer surface with a predetermined diameter, and for a beverage can having a bottom and an outer surface with a predetermined diameter less than the mug outer surface diameter, the holder comprising:
   (a) a cylindrical shell extending between opposite upper and lower ends, the shell including an outer surface and an inner surface with a diameter greater than the mug outer surface diameter, the shell inner surface slidingly engaging the beverage mug outer surface, the shell including a slot having generally vertical first and second edges extending from the shell upper end to a terminus adjacent the shell lower end to receive the beverage mug handle;
   (b) a flange projecting outward from the shell outer surface, the flange including a radial slot juxtaposed with the shell slot, the radial slot having first and second edges aligned with the shell slot first and second edges respectively, and extending from the shell outer surface outward to a terminus;
   (c) a bottom plate projecting inward from the shell lower end, the bottom plate supportingly engaging the bottom of the beverage can; and
   (d) engaging means for slidingly engaging the can outer surface and supportingly engaging the mug bottom.

2. The holder of claim 1, wherein the flange projects outward from the shell outer surface at the shell upper end.

3. The holder of claim 2, further comprising:
   (a) a slot first side plate extending from the shell slot first edge outward to an outer edge, and extending upward to the radial slot first edge; and
   (b) a slot second side plate extending from the shell slot second edge outward to an outer edge, and extending upward to the radial slot second edge.

4. The holder of claim 3, further comprising a slot end plate extending between the first and second slot side plate outer edges, and extending upward to the radial slot terminus.

5. The holder of claim 4, wherein the engaging means comprises a projecting member projecting upward from the bottom plate, the projecting member having a top surface to supportingly engage the mug bottom, the projecting member having a generally vertical surface to slidingly engage the can outer surface.

6. The holder of claim 5, wherein the projecting member comprises a gusset including:
   (a) a generally vertical first edge attached to the shell inner surface adjacent the shell lower end;
   (b) a generally vertical second edge opposite the first edge and inward of the shell inner surface;
   (c) a bottom edge extending between the first and second edges, the bottom edge being attached to the bottom plate; and
   (d) a generally horizontal top edge extending between the first and second edges, the top edge opposite the bottom edge, so that the top edge supportingly engages the mug bottom when the mug is inserted into the holder, and the second edge slidingly engages the can outer surface when the can is inserted into the holder.

7. The holder of claim 5, wherein the projecting member comprises:
   (a) a generally horizontal shelf having a first edge attached to the shell inner surface adjacent the shell lower end, the shelf extending inward to a second edge; and
   (b) a generally vertical annular wall extending from the bottom plate upward to the shelf second edge, so that the shelf supportingly engages the mug bottom when the mug is inserted into the holder, and the annular wall slidingly engages the can outer surface when the can is inserted into the holder.

8. A holder for a beverage mug having a handle, a bottom, and an outer surface with a predetermined diameter, and for a beverage can having a bottom and an outer surface with a predetermined diameter less than the mug outer surface diameter, the holder comprising:
   (a) a right circular cylindrical shell extending between opposite upper and lower ends, the shell including an outer surface and an inner surface having a circumference and having a diameter greater than the mug outer surface diameter, the shell inner surface slidingly engaging the beverage mug outer surface, the shell including a slot having generally vertical first and second edges extending from the shell upper end to a terminus adjacent the shell lower end to receive the beverage mug handle;
   (b) a flange encircling the shell, the flange projecting outward from the shell outer surface at the shell upper end, the flange including a radial slot juxtaposed with the shell slot, the radial slot having first and second edges aligned with the shell slot first and second edges respectively, and extending from the shell outer surface outward to a terminus;
   (c) a bottom plate projecting inward from a circular outer edge disposed adjacent the shell lower end, the bottom plate supportingly engaging the bottom of the beverage can; and
   (d) engaging means for slidingly engaging the can outer surface and supportingly engaging the mug bottom.

9. The holder of claim 8, further comprising:
   (a) a slot first side plate extending from the shell slot first edge outward to an outer edge, and extending from the shell slot terminus upward to the radial slot first edge;
   (b) a slot second side plate extending from the shell slot second edge outward to an outer edge, and extending from the shell slot terminus upward to the radial slot second edge; and
   (c) a slot end plate extending between the first and second slot side plate outer edges, and extending from the shell slot terminus upward to the radial slot terminus.

10. The holder of claim 9, wherein the engaging means comprises a projecting member projecting upward from the bottom plate, the projecting member having a top surface to supportingly engage the mug bottom, the projecting member having a generally vertical surface to slidingly engage the can outer surface.

11. The holder of claim 10, wherein the projecting member comprises a plurality of gussets spaced apart around the shell inner surface circumference, each gusset including:
   (a) a generally vertical first edge attached to the shell inner surface adjacent the shell lower end;
   (b) a generally vertical second edge opposite the first edge and inward of the shell inner surface;
   (c) a bottom edge extending between the first and second edges, the bottom edge being attached to the bottom plate; and
   (d) a generally horizontal top edge extending between the first and second edges, the top edge opposite the bottom edge, so that the top edges of the gussets supportingly engage the mug bottom when the mug is inserted into the holder, and the second edges of the gussets slidingly engage the can outer surface when the can is inserted into the holder.

12. The holder of claim 10, wherein the projecting member comprises:
   (a) a generally horizontal shelf having a first edge attached to the shell inner surface adjacent the shell lower end, the shelf extending inward to a second edge; and
   (b) a generally vertical annular wall extending from the bottom plate outer edge upward to the shelf second edge, so that the shelf supportingly engages the mug bottom when the mug is inserted into the holder, and the annular wall slidingly engages the can outer surface when the can is inserted into the holder.

13. A holder for a pair of beverage mugs, each mug having a handle, a bottom, and an outer surface with a predetermined diameter, and for a pair of beverage cans, each can having a bottom and an outer surface with a predetermined diameter less than the mug outer surface diameter, the holder comprising:
   (a) a right circular cylindrical first shell extending along a longitudinal axis between opposite upper and lower ends, and a right circular cylindrical second shell extending along a longitudinal axis between opposite upper and lower ends, the first longitudinal axis being generally parallel to the second longitudinal axis, each shell including an outer surface and an inner surface having a circumference and having a diameter greater than the mug outer surface diameter, each shell inner surface slidingly engaging the outer surface of one of the beverage mugs, each shell including a slot having generally vertical first and second edges extending from the shell upper end to a terminus adjacent the shell lower end to receive the handle of one of the beverage mugs;
   (b) a flange encircling both the first and second shells, the flange projecting outward from each shell outer surface at the shell upper end, the flange including a first radial slot juxtaposed with the first shell slot, the first radial slot having first and second edges aligned with the first shell slot first and second edges respectively, and extending from the first shell outer surface outward to a terminus, the flange including a second radial slot juxtaposed with the second shell slot, the second radial slot having first and second edges aligned with the second shell slot first and second edges respectively, and extending from the second shell outer surface outward to a terminus;

(c) a first bottom plate projecting inward from a circular outer edge disposed adjacent the first shell lower end, and a second bottom plate projecting inward from a circular outer edge disposed adjacent the second shell lower end, each bottom plate supportingly engaging the bottom of one of the beverage cans; and (d) engaging means for slidingly engaging each can outer surface and supportingly engaging each mug bottom.

14. The holder of claim 13, wherein the first shell and the second shell each further comprise:

(a) a slot first side plate extending from the shell slot first edge outward to an outer edge, and extending from the shell slot terminus upward to the radial slot first edge;

(b) a slot second side plate extending from the shell slot second edge outward to an outer edge, and extending from the shell slot terminus upward to the radial slot second edge; and (c) a slot end plate, extending between the first and second slot side plate outer edges, and extending from the shell slot terminus upward to the radial slot terminus.

15. The holder of claim 14, wherein the first radial slot terminus is disposed adjacent the second shell, and the second radial slot terminus is disposed adjacent the first shell, so that when two mugs are inserted into the holder, the handles will be nested closely together to conserve space.

16. The holder of claim 15, wherein the engaging means comprises a plurality of gussets spaced apart around each shell inner surface circumference, each gusset including:

(a) a generally vertical first edge attached to the shell inner surface adjacent the shell lower end;

(b) a generally vertical second edge opposite the first edge and inward of the shell inner surface;

(c) a bottom edge extending between the first and second edges, the bottom edge being attached to the bottom plate; and (d) a generally horizontal top edge extending between the first and second edges, the top edge opposite the bottom edge, so that the top edges of the gussets supportingly engage the mug bottom when the mug is inserted into the holder, and the second edges of the gussets slidingly engage the can outer surface when the can is inserted into the holder.

17. The holder of claim 16, wherein the gussets each further comprise a radius between the second edge and the top edge, to facilitate sliding engagement of the can outside surface with the gusset second edge.

18. The holder of claim 17, wherein the first and second bottom plate each further comprises a drain including a nozzle having a hole therethrough in communication with the first and second shell respectively, for draining liquids from the holder.

19. The holder of claim 15, wherein the engaging means comprises a first step encircling the first shell inner surface circumference, and a second step encircling the second shell inner surface circumference, each step including:

(a) a generally horizontal shelf having a first edge attached to the shell inner surface adjacent the shell lower end, the shelf extending inward to a second edge; and (b) a generally vertical annular wall extending from the bottom plate outer edge upward to the shelf second edge, so that each shelf supportingly engages the bottom of one of the mugs when the mug is inserted into the holder, and each annular wall slidingly engages the outer surface of one of the cans when the can is inserted into the holder.

20. The holder of claim 19, wherein the first and second bottom plate each further comprises a drain including a nozzle having a hole therethrough in communication with the first and second shell respectively, for draining liquids from the holder.

* * * * *